(12) United States Patent
Corcoran et al.

(10) Patent No.: US 10,310,145 B2
(45) Date of Patent: Jun. 4, 2019

(54) IMAGE ACQUISITION SYSTEM

(71) Applicant: FotoNation Limited, Galway (IE)

(72) Inventors: Peter Corcoran, Claregalway (IE); Petronel Bigioi, Galway (IE); Christopher Dainty, Galway (IE); Alexander Goncharov, Galway (IE)

(73) Assignee: FotoNation Limited, Galway (IE)

( * ) Notice: Subject to any disclaimer, the term of this patent is extended or adjusted under 35 U.S.C. 154(b) by 93 days.

(21) Appl. No.: 15/257,735

(22) Filed: Sep. 6, 2016

(65) Prior Publication Data

US 2017/0168200 A1    Jun. 15, 2017

Related U.S. Application Data

(60) Provisional application No. 62/265,277, filed on Dec. 9, 2015.

(51) Int. Cl.
*H04N 9/47* (2006.01)
*H04N 7/18* (2006.01)
*G02B 3/00* (2006.01)
*G02B 27/00* (2006.01)
*G06K 9/00* (2006.01)
(Continued)

(52) U.S. Cl.
CPC ......... *G02B 3/0043* (2013.01); *G02B 3/0056* (2013.01); *G02B 27/0075* (2013.01); *G06K 9/0061* (2013.01); *G06K 9/00604* (2013.01); *H04N 5/2254* (2013.01); *H04N 5/2256* (2013.01); *H04N 5/332* (2013.01); *H04N 9/04* (2013.01)

(58) Field of Classification Search
None
See application file for complete search history.

(56) References Cited

U.S. PATENT DOCUMENTS 6,096,155 A    8/2000    Harden et al.
6,649,008 B2    11/2003    Feldman et al.
(Continued)

FOREIGN PATENT DOCUMENTS

CN    101154264 A    4/2008
EP    2881775 A1    6/2015
(Continued)

OTHER PUBLICATIONS

"All-glass wafer-level lens technology for array cameras", Palle Geltzer Dinesen, AAC Technologies, Digital Photography X, edited by Nitin Sampat, Radka Tezaur, et. al. Proc. of SPIE-IS&T Electronic Imaging, SPIE vol. 9023, 902303. Mar. 7, 2014, 10 pages.
(Continued)

*Primary Examiner* — Talha M Nawaz

(57) ABSTRACT

An image acquisition system for acquiring iris images for use in biometric recognition of a subject includes an optical system comprising a cluster of at least 2 lenses arranged in front of a common image sensor with each lens optical axis in parallel spaced apart relationship. Each lens has a fixed focus and a different aperture to provide a respective angular field of view. The lens with the closest focus has the smallest aperture and the lens with the farthest focus has the largest aperture so that iris images can be acquired across a focal range of at least from 200 mm to 300 mm.

23 Claims, 6 Drawing Sheets

(51) Int. Cl.
*H04N 5/225* (2006.01)
*H04N 5/33* (2006.01)
*H04N 9/04* (2006.01)

(56) References Cited

U.S. PATENT DOCUMENTS

| | | | |
|---|---|---|---|
| 9,077,879 | B2 | 7/2015 | Dinesen |
| 2006/0039486 | A1 | 4/2006 | Ng et al. |
| 2007/0023662 | A1* | 2/2007 | Brady .................... G01J 5/0022 250/338.3 |
| 2007/0109438 | A1* | 5/2007 | Duparre ............... G02B 3/0012 348/335 |
| 2007/0109662 | A1* | 5/2007 | Ohno ................... G02B 15/177 359/682 |
| 2013/0258044 | A1 | 10/2013 | Betts-LaCroix |
| 2013/0315437 | A1* | 11/2013 | Kerschner ............ G06Q 30/018 382/100 |
| 2014/0300869 | A1* | 10/2014 | Hirsch ................ G02B 27/2214 353/7 |
| 2014/0375866 | A1 | 12/2014 | Dinesen |

FOREIGN PATENT DOCUMENTS

| | | |
|---|---|---|
| WO | 2006039486 A2 | 4/2006 |
| WO | 2011124512 A2 | 10/2011 |
| WO | 2016177914 A1 | 11/2016 |

OTHER PUBLICATIONS

"Miniaturized imaging systems", R. Volkel, M. Eisner, K.J. Weible, Microelectronic Engineering 67-68 (2003) 461-472.

"Rapid fabrication of semi-ellipsoid microlens using thermal reflow with two different photoresists", Zhen-Jie Lian, Shih-Yu Hung, Ming-Ho Shen, Hsiharng Yang Microelectronic Engineering 115 (2014) 46-50.

"Wafer-level manufacturing technology of glass microlenses", U. Gossner, T. Hoeftmann, R. Wieland, W. Hansch Appl. Phys. A (2014) 116:415-425.

International Search Authority (EPO), International Search Report and Written Opinion for PCT/EP2016/060941 Filed May 16, 2016; Opinion completed Aug. 9, 2016, dated Aug. 18, 2016, 9 pages.

* cited by examiner

| Surf | Type | Radius | Thickness | Glass | Diameter | Conic | Comment |
|---|---|---|---|---|---|---|---|
| OBJ | STANDARD | Infinity | 280 | | 60 | 0 | iris plane |
| STO | STANDARD | 1.78 | 0.6 | N-BK7 | 1.75 | 0 | convex spherical |
| 2 | EVENASPH* | Infinity | 2.2 | | 1.66 | 0 | plano-aspheric |
| 3 | STANDARD | -3.2 | 0.5779** | SF5 | 0.98 | 0 | concave spherical |
| 4 | EVENASPH* | Infinity | 0.8 | | 0.95 | 0 | plano-aspheric |
| IMA | STANDARD | Infinity | | | 0.97 | | detector plane |

| | Surface 2 | Surface 4 |
|---|---|---|
| Coeff A on r 4 : | 0.0180513 | 0.093909 |
| Coeff B on r 6 : | -0.000847 | 0.861512 |
| Coeff C on r 8 : | 0 | -1.79448 |

Figure 3

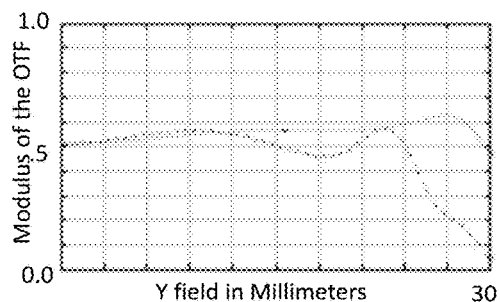
d=180 mm, D=1.3 mm, v=86.33 cyc/mm
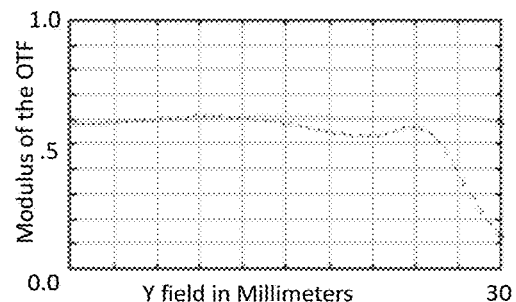
d=200 mm, D=1.3, v= 95 cyc/mm
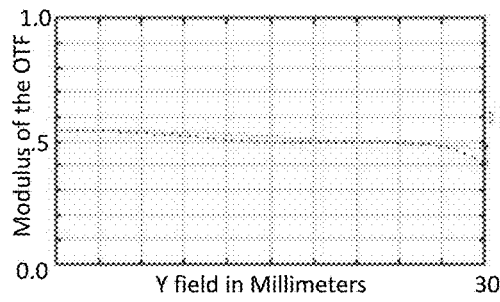
d=250 mm, D=1.3 mm , v=119 cyc/mm
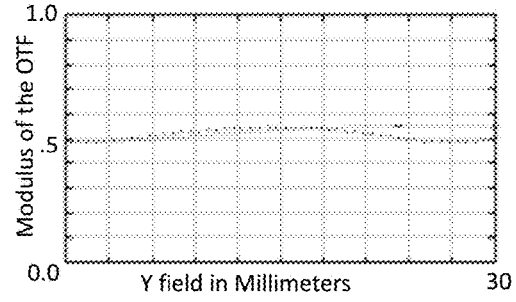
d=280 mm, D=1.7, v=133.3 cyc/mm
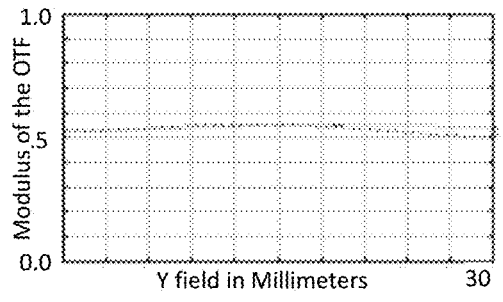
d=300 mm, D=1.7 mm , v=143 cyc/mm
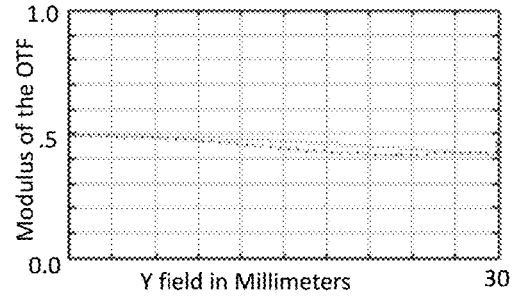
d=350 mm, D=1.7, v=166.6 cyc/mm
Figure 4

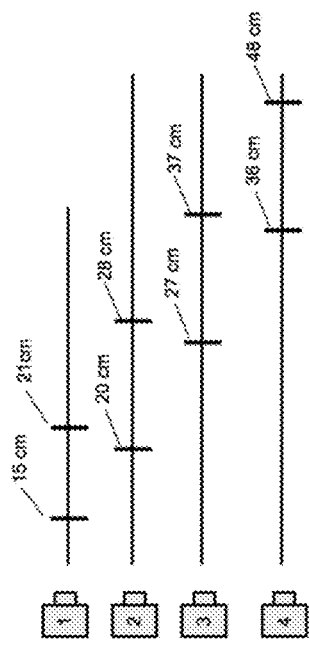
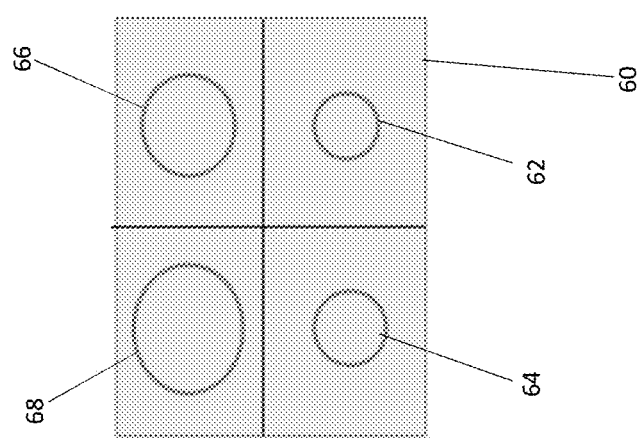
Figure 6

IMAGE ACQUISITION SYSTEM

FIELD

The present invention relates to an image acquisition system and in particular a system including a plurality of optical assemblies, each arranged to enable the capture of respective images of iris regions used in biometric recognition.

BACKGROUND

Biometric recognition based on images of iris regions uses individual radial patterns in the iris. Image acquisition systems for such biometric recognition need to resolve at least 2 lines per mm within the iris pattern in order to provide reliable recognition of a subject. In mobile phones and smartphone in particular, there are two factors that limit direct use of conventional systems of lenses: the mobile phone market strives to minimize the overall camera cost; and making the phone housing as thin as possible.

It is desirable to have a dedicated image acquisition system that can capture images of the iris region of the face in sharp focus across a range of distances with approximately the same size and suitable for incorporation within the form factor of a smartphone.

More specifically, with a modern handheld device such as a smartphone, it is desirable to enable the user to hold the device at a distance that is comfortable for them, so that a user facing camera of the device can acquire a required image including an iris pattern. This distance could range from as close to the device as 15-20 cm to as far away as 40-45 cm and possibly further.

As well as to unlock a device, it may also be desired to acquire iris images during normal use of the device to continuously or periodically authenticate the user of the device—in such cases it would be undesirable to force the user to hold the device at any distance other than the distance at which they feel comfortable. Again this could range from, say, 15 cm up to and beyond 45 cm.

Typically iris regions for use in biometric recognition are acquired in near-infrared (NIR) wavelengths ranging from 740 nm up to 900 nm and even 1000 nm and beyond and the optical system needs to be designed and optimized accordingly. However it can be challenging to achieve an acceptably sharp focus depth of more than about 10 cm for lenses used in such systems. So, for example, a fixed focus lens that has a focus peak at, say, 20 cm, would only provide a usable range from 15-25 cm for iris acquisition.

A lens with variable focus might be employed, but this would result in changes in the size of the iris regions extracted. In addition, using an auto-focus mechanism may be prohibitive in terms of space or for cost constrained applications.

Referring to FIG. 1, the average distance between eyes varies, depending on sex and ethnicity, from about 60-65 mm and the average iris diameter ranges from about 10.1-13 mm. Also, as the eyes may not be exactly centered, it may be desirable to acquire a rectangular region of approximately 100 mm width to ensure both eyes are imaged. If we consider the field of view (FoV) of the camera to acquire suitable image width at a distance from the eye region to the face of d=15 cm we see that the half angle of the FoV is given as a tan(50 mm/150 mm) which gives a horizontal field of view angle of approximately 37 degrees.

With a variable focus lens, when the focus is switched to a longer distance, say 40 cm, the distance between the eyes and the size of iris pupil will be smaller in terms of pixels, as the face is more distant. An approximate estimate can be made based on an exemplary image sensor of 3,000 pixels by 1,800 pixels which is approximately a 5 megapixel sensor (although it will be appreciated that a range of sensor sizes and resolutions may be employed). At 15 cm we showed that this maps onto 100 mm width, thus the individual iris region with an average diameter of 12 mm will be 360 pixels across. However at 30 cm, the same iris region will be reduced to 180 pixels and at 40 cm it will be further reduced to 120 pixels or less—a point where the quality of the acquired image of the iris pattern may not be sufficient for recognition purposes (although some applications may require less than 120 pixels). It will also be appreciated that the illumination of an iris at 40 cm will be significantly less than at 15 cm and this can also cause problems with acquiring the required image quality at such distances.

Even then, if there is a need for a resizing of the iris region in each case to normalize iris images acquired at different distances to the same size of iris region before processing, such normalization may be a potential source of artifacts and errors in the underlying biometric pattern.

Further, in an auto-focus system, the user must hold the device in a fixed position until a focus lock is achieved. This can take several seconds and can provide a less than optimal focus depending on the number of focus stops provided by the focus mechanism.

Finally, it will also be appreciated that it can be useful to be able to acquire an image of both a face surrounding an iris region as well as the iris region for tracking purposes. Thus, a face detection and tracking system could acquire images continually and locate an iris region without the IR illumination typically used to acquire an image of an iris pattern. However, using a single auto-focussing system would make it difficult to acquire images of both iris and face regions across a range of 15 cm to 40 cm.

It can be seen therefore that the design of an image acquisition system for iris regions that can capture both iris regions at the same time and across a range of distances suitable for a modern handheld imaging device such as a smartphone presents some challenges.

CN101154264 discloses a large field depth iris image acquisition and recognition system based on a plurality of fixed-focus cameras. The system images the iris with the fixed-focus cameras each having different imaging object distance ranges and produces multi-path fixed-focus image results. One or a plurality of multi-path fixed-focus image results is chosen through distance measurement or image quality evaluation method, before image processing and identification of chosen qualified iris image data is performed. Each of the cameras employed however comprises the same optics, set to a respective focus distance and so this system involves many of the drawbacks highlighted above.

SUMMARY

According to the present invention, there is provided an image acquisition system according to claim 1.

Embodiments of the present invention enable iris images to be acquired at a large range of focus distances and in particular include the focus range 200-300 mm which many users find comfortable for positioning a handheld device such as a smartphone for the purposes of acquiring a selfie type image. Nonetheless, embodiments allow a greater range of focus distance to provide increased flexibility in acquiring iris images for a variety of applications.

In embodiments, each lens comprises an assembly of optical elements. Each lens has a different angular field of view. Each lens has a different focus range, so that at least one of the lenses forms an in-focus image across the operating range of the image acquisition system. Each lens has a different aperture, with the closest focusing lens having the smallest aperture and the farthest focusing lens having the largest aperture. This ensures that the exposure from a constant IR flash can be appropriate for the camera-to-iris distance, and has the advantage that the depth of field can be increased for the close-focus lens as well as the iris sampling (lens resolution) can be maintained higher than a required level, for example 2 lines per mm.

The lenses can be arranged in regular or irregular arrangement across the face of the image sensor.

The optical system can be fabricated using wafer scale technology. Some embodiments comprise lenses comprising two layers of optical elements with a total of four surfaces. The two layers of each lens are preferably similarly spaced from the image sensor, and the different focal lengths of the lens are achieved by adjusting the curvatures of the four surfaces accordingly.

In embodiments where the surfaces are molded, they car have aspheric shapes to minimize aberrations, and because only a narrow range of wavelengths are of interest (e.g. 750 to 850 nm), it is possible to make each camera almost diffraction-limited.

BRIEF DESCRIPTION OF THE DRAWINGS

Various embodiments of the invention will now be described, by way of example, with reference to the accompanying drawings, in which:

FIG. 3 comprises a table listing the optical parameters (units of length are given in mm) for optical elements of the system of FIG. 2;

FIG. 4 shows MTF curves vs field within the iris plane (0 . . . 30 mm) for the lenses of FIG. 2;

FIG. 6 illustrates a cluster of lenses in a four lens embodiment of the present invention along with their respective focus ranges.

DETAILED DESCRIPTION

Embodiments of the present invention comprise a multi-optic single-sensor image acquisition system including a cluster of fixed-focus lenses mounted to the image sensor with parallel spaced apart optical axes. Each lens directs light to a specific region of the sensor with each lens designed to offer a different FoV at a different, fixed, focus length so that iris regions captured through each lens can have similar characteristics such as size and resolution.

Each lens in the cluster can have a different diameter of entrance pupil AS, and a different f-number F=AS/f. Each lens can be focused on a different distance. For example, the diffraction-formulae for the near and far points, NP and FP, when focused on distance Z, can be used to work out the required mean focus distances Z, for each lens in the cluster:

$$NP = \frac{f(Z+\delta)}{Z+\delta-f}$$

$$FP = \frac{f(Z-\delta)}{Z-\delta-f}$$

where $\delta=2\lambda F^2$ is the depth of focus and $\lambda$ is the wavelength, typically 0.85 microns for an camera used for iris image acquisition.

Figure 1:
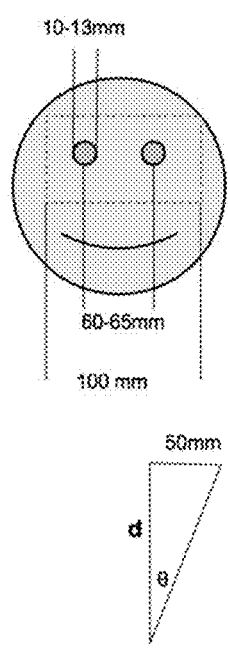
FIG. 1 shows schematically the scale of a face and iris region and the field of view required to image such regions at an acquisition distance d.
Figure 2:
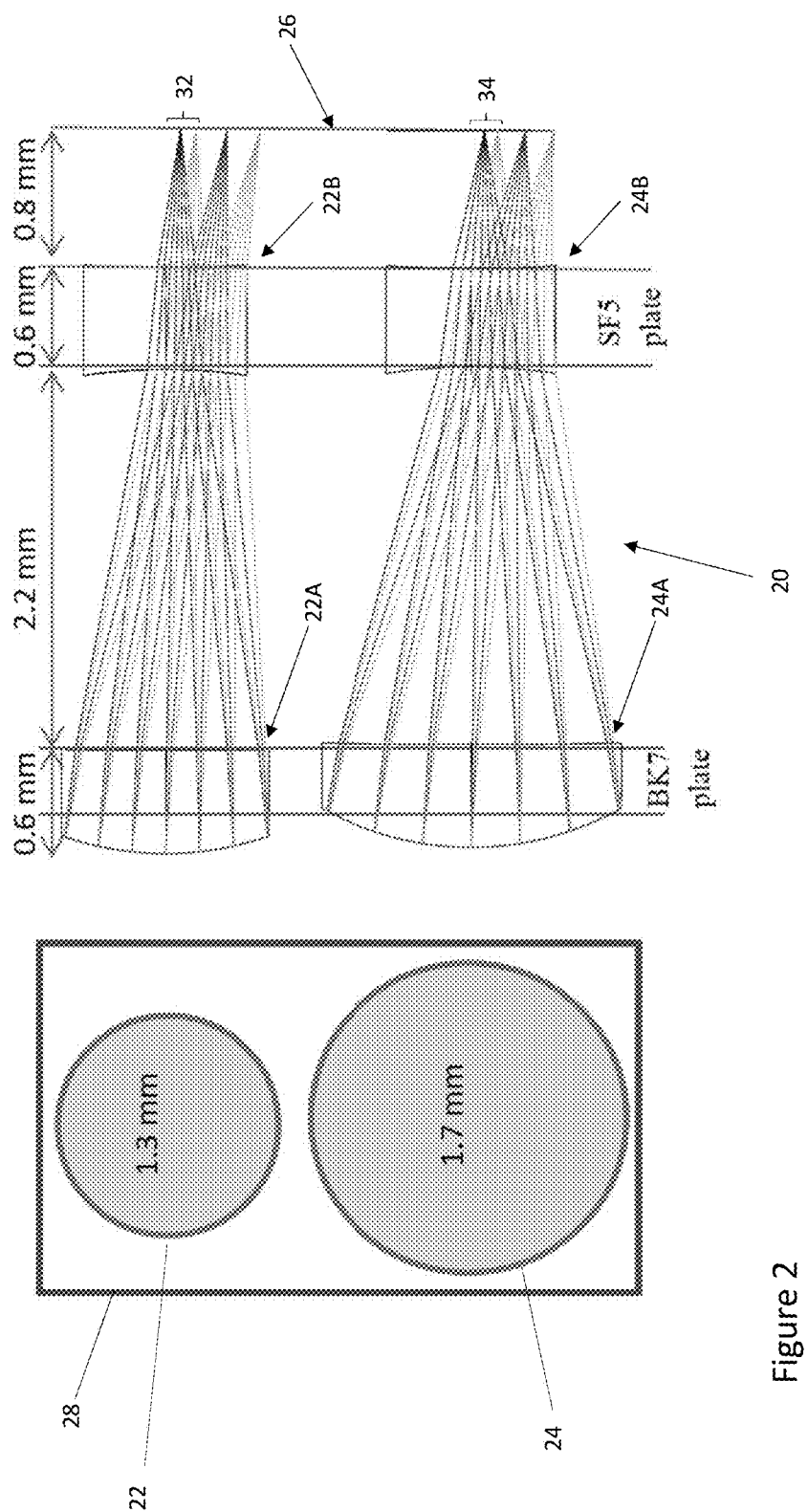
FIG. 2 shows a dual lens cluster according to a first embodiment of the present invention.

Referring to FIG. 2, in a first embodiment, the optical system 20 comprises two nearly identical air-spaced lens doublets 22, 24, which are optimised for two different distances covering the overall range 180-350 mm between the eye and the camera. The doublets 22, 24 shown in front view in FIG. 2, each comprise a front optical element 22A, 24A and a rear optical element 22B, 24B. The front optical elements 22A, 24A can each be formed on the same substrate using a wafer level optic (WLO) process such as described below in more detail. Similarly, the rear optical elements 24A, 24B can be formed on the same substrate using a WLO process such as described below in more detail. Typically, a WLO process produces a large array of optical elements on a common substrate and the substrate can then be diced into plates, the outline 28 of one of which is shown in FIG. 2, comprising the optical elements for the lenses of a cluster. Each plate incorporating the front optical elements and rear optical elements for the lenses of a cluster is assembled in front of a sensor 26 and spaced apart from the sensor as required, so that each lens focuses a respective image on a separate portion of the sensor 26.

The sensor 26 may comprise either a conventional RGB type array, where the natural IR sensitivity of the RGB pixels is used to acquire images which are illuminated with an IR illumination source (not shown), such as an LED flash, typically integrated within the image acquisition device housing the optical system 20. When not illuminated by the IR illumination source, the sensor 26 can be used to acquire visible images of a scene and these can be used for example to locate and track iris regions prior to IR image acquisition.

Alternatively, the sensor 26 may comprise an RGBW (where the white pixels are also IR sensitive) or RGB-IR array (including IR only sensitive pixels) where visible and IR images of a scene can be acquired substantially simultaneously. Because of their differing sensitivities, the IR sensitive pixels may require a different exposure time than the RGB pixels and so the visible and IR images may need to be read independently from the sensor 26 after different exposure times.

In the illustrated embodiment, each optical element of the lens doublets 22, 24 is made of a different type of glass, in the example, BK7 for the front optical elements 22A, 24A and SF5 for the rear optical elements 22B, 24B, and provides chromatic correction within the bandwidth (800-900 nm) of flash light used to illuminate the iris during image acquisition. It will be appreciated that as both lens doublets 22, 24 share their substrates, cost-effective manufacturing is enabled. In alternative embodiments, the front and/or rear optical elements can be made of plastics material.

The rear glass substrates 22B, 24B are mounted 0.8 mm from the sensor 26 and the front glass substrates 22A, 24A are mounted 2.2 mm from the rear glass substrate. Each substrate is approximately 0.6 mm thick to provide a maximum thickness of approximately 4.2 mm (TTL) which it will be appreciated is suitable for incorporation within a typical smartphone housing.

The aperture diameter of lens doublets 22 and 24 is D=1.3 mm and D=1.7 mm respectively. The focal length is f=4.26 mm giving F/3.36 and F/2.56 focal ratio and 3.28 and 2.5 µm Airy disk radius, respectively.

The lens doublets 22, 24 cover the distance range of 180-250 mm and 250-350 mm respectively, so providing a total eye-to-camera distance range of 180-350 mm.

FIG. 2 shows central ray patterns up to 10 deg off-axis, which is equivalent to ±30 mm linear field in the iris plane. Rays 32 and 34 indicate the centre and the edge of a 10 mm iris image acquired by each doublet 22, 24 at their respective ranges and it will be noted that the extent of these across the sensor 26 is similar.

Both front and rear optical elements in the air-spaced lens doublets 22, 24 have an aspheric back surface, with the central radius of curvature c=0 (the plano-surface is chosen for easy manufacturing), whereas the front surfaces are made spherical. The lens doublets 22, 24 are optimised to work in near infrared λ=800-900 nm, each covering specific distance ranges: near 180-250 mm and mid-distances 250-350 mm without need for refocusing system.

FIG. 3 comprises a table listing the optical parameters (units of length are given in mm) for the doublet 24 of the system 20 of FIG. 2 as well as the aspheric surface coefficients for the back surfaces* of the front and rear optical elements 24A,34B sag: $z = A \cdot r^4 + B \cdot r^6 + C \cdot r^8$.

All parameters in the lens doublets 22, 24 are identical except for the central thickness of the rear optical element (SF5 plate) indicated by the ** in FIG. 3. For the smaller D=1.3 mm lens doublet 22, imaging at distances 180-250 mm, the lens central thickness is 0.62 mm, whereas for longer distances 250-350 mm, the lens doublet 24 with a larger aperture D=1.7 mm is required to maintain the angular resolution and the return light flux from the iris, while to fix the back focal distance to 0.8 mm, the central thickness of the concave lens is reduced to 0.5779 mm. Thus, these rear elements differ by 0.0421 mm in thickness, i.e. 0.62 mm Vs 0.5779 mm.

Typical air-spaced achromatic doublets operate at narrow field of view, 1-2 degrees only. Introducing two aspheric surfaces and using the axial distance between the positive and negative lenses as a free parameter, a field of view at relatively narrow wavelength range λ=800-900 nm up to 10 degrees can be achieved. In principle, one could image both irises at the edge of the linear field ±40 mm, however to maximise image quality, it can be preferable to image one iris in the central part of the field within ±30 mm.

The main compromise is to maintain high image quality for a practical distance range without refocusing. This is achieved for near distances 180-250 mm by using a smaller aperture doublet 22 making the lens quite slow, F/3.4, which helps to extend depth of focus. Lens optimisation was carried out for spot size and MTF curves with particular attention to the mid-frequency, which corresponds to 2 lines per mm in iris plane: v=2*distance/f, where f=4.2 mm.

FIG. 4 presents MTF curves for key distances 180, 200, 250, 280, 300 and 350 mm, with the corresponding mid-frequency of 85.7, 95, 119, 133.3, 143 and 166.7 cycles/mm. The best performance (MTF nearly 0.6) is achieved at distance d=200 mm. The contrast does not fall below 0.5 at distances 180-350 mm, in the central part of the field. Note that the sagittal MTF is more relevant measure of lens image quality, since the iris patterns are radial in nature.

The design of the first embodiment enjoys several advantages:
1) The central thickness is 4.22 mm readily enabling the optical system to be incorporated within a smartphone.
2) Relatively fast f/2.6 lens working at mid-distances without need for refocusing.
3) Nearly diffraction-limited image quality within 30 mm field in object space, MTF>0.5 at 2 lines/mm.
4) Nyquist sampling is possible with 1 micron pixel size for 2.5 µm Airy disk radius for the doublet 24.
5) Both optical elements within each doublet 22, 24 comprise a plano-aspheric back surface, which simplifies manufacturing process (glass or plastics moulding).
6) The two lenses 22, 24 are identical except for working aperture and central thickness of the negative lens.

Note that in order to keep the depth of focus large at near distances, the lens focal ratio is reduced to f/3.4. Nonetheless, residual chromatic aberration in the doublets 22, 24 even for 100 nm bandwidth for iris illumination is not negligible and might limit lens performance. Some embodiments could employ a stray light blocking arrangement to prevent unwanted background from the neighbour doublet.

Where the sensor 26 is employed to acquire both visible and IR (iris) images, a filter (not shown) may be interposed in the optical path between the lenses and the sensor 26. The filter can be arranged to pass visible and a narrow band of IR light to prevent leakage.

The longest focal length lens 24 would focus at the farthest distance, and the value of the focal length f is determined by the optical design, the required total-track-length (TTL) and the extent to which it is possible to realize a telephoto design (f>TTL). A realistic value for the longest focal length f is around 4.0-5.0 mm. The field of view is then determined for this longest focal length camera by the detector size.

Figure 5:
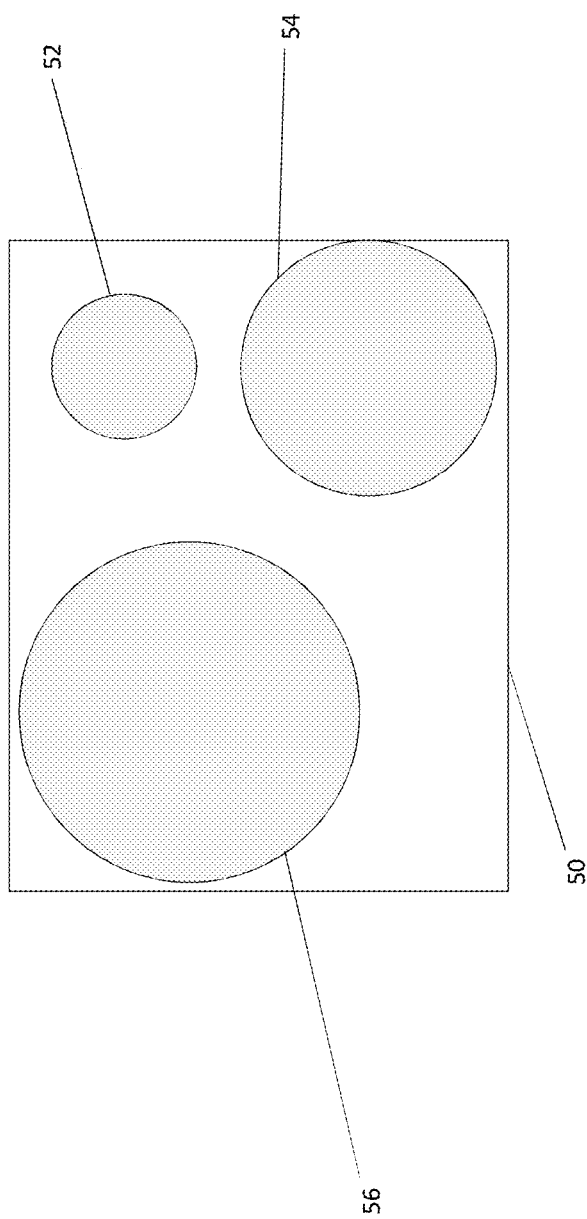
FIG. 5 illustrates a cluster of lenses in a three lens embodiment of the present invention.

FIG. 5 shows a cluster 50 of three lenses 52, 54, 56 each with respective aperture diameters arranged in an irregular grid according to a second embodiment of the invention. The following exemplary parameters could be employed for the cluster 50 of FIG. 5:

Near distance camera (52): F1.8, f=1.7 mm, d=0.95 mm, focus 177 mm (DoF 133-265 mm)
Mid-distance camera (54): F1.8, f=3.0 mm, d=1.7 mm, focus 316 mm (DoF 265-390 mm)
Far-distance camera (56): F1.8, f=4.0 mm, d=2.2 mm focus 450 mm (DoF 390-530 mm)

In this example, the three camera cluster of fixed focus cameras covers all focus distances from 133 to 530 mm. As the focal lengths of each of the cameras differ, this cluster of lenses might not be as readily fabricated as those of the other embodiments described herein.

In a third embodiment, FIG. 6, a cluster 60 comprises 4 elements, a first 62 arranged to have a central object focus distance of, say, 18 cm, the second 64 a central focus distance of 24 cm, the third 66, a central focus distance of 32 cm and the fourth 68, a central focus distance of 42 cm. In this embodiment, the usable focus depth is least for the closest focused camera 62, say 6 cm increasing to 8 cm, 10 cm and 12 cm for each of the lenses 64 to 68. Thus the first camera can span a range from 15-21 cm, the second from 20-28 cm, the third from 27-37 cm and the fourth from 36-48 cm. Within these ranges the iris regions will be in sufficiently sharp focus for high quality acquisition by the image acquisition system.

Again, the field of view of each camera 62 to 68 is different and is determined in this exemplary embodiment for the 10 cm width across the eye region. Thus, for the first camera 62 it will have a FoV, determined by the 18 cm main focus of 31 degrees; for the second camera it is 24 degrees; for the third, 18 degrees and for the fourth it is 14 degrees.

Note that all the lenses 62 ... 68 are arranged on a single image sensor as in the first and second embodiments. For comparison purposes we assume this is the same as the 5 mega pixel sensor described in the problem statement—3000×1800 pixels—so that each optical element directs its image onto a 1500×900 pixel region of the sensor.

Let us take the closest optical element as an exemplar. At the closest distance, 15 cm this would only span an eye-to-eye distance of 8.3 cm across the 1500 pixel sensor leading to an iris diameter of 1.2*(1500/8.3)=216 pixels across the iris; at the other extreme of this first unit the iris will be acquired at 21 cm distance where the FoV will span about 11.5 cm and the average iris diameter will be 1.2*(1500/11.5)=156 pixels. At the center point of 15 cm the iris diameter will be 180 pixels. For the second optical element 64, we have corresponding range of iris diameter sizes from: 214-152 pixels; for the third optical element 66, 210-152 pixels and similarly for the fourth optical element 68.

Where all images are acquired from the same sensor, the image data can be directed and processed by a single processing element. Typically this might be an ISP (image signal processor), but given the specialized nature of the present invention, it is likely that a dedicated hardware processing unit would be used. Such a unit can provide a specialized addressing scheme to direct the image data from a single image sensor into 2, 3 or 4 independent processing streams, each corresponding to a portion of the sensor associated with a specific lens. This allows a conventional mass manufactured 5 megapixel sensor to be used.

Alternative embodiments could employ a custom sensor with separate addressing/shift circuitry for each quadrant.

When the data is off-loaded from the sensor, some statistical data can be obtained during the off-loading process. This can provide information on the sharpness of each acquired image and its dynamic range. In turn this statistical data can be used to determine which lens is providing the best focused image—the form of image in each will include a different portion of the face and thus the global statistics, textures, etc will different in each of the 2, 3 or 4 image regions. Information may also be available in the device about the locations and gaze of the eyes.

In some embodiments, the image acquisition system will have available additional information, for example, an indication of the face size and location, thus enabling an estimation of the approximate distance of the subject from the device. This additional information can provide input to determine which of the images to retain for iris region extraction.

In still further embodiments, one of the optical elements could have a very large FOV, catching the full face and possibly some head and/or shoulders too.

If the subject lies within a region of overlapping focus from adjacent lenses, then the image chosen would normally default to the lens acquiring a larger iris pattern. However in some embodiments both regions may be processed. In other embodiments that decision may employ both regional sharpness (higher sharpness indicating better focus) and additional statistical information for each region.

Once an image is selected, the iris regions are segmented and normal iris analysis and processing is performed to determine if the iris regions match an enrolled iris pattern of the device user, or other authorized person, for example, as disclosed in WO2011/124512 (Ref: FN-458).

As indicated, some embodiments will be arranged to select a single eye that provides the best image quality (focus resolution) and will authenticate the user to a sufficient level of confidence from that single eye image.

Each of the above 2, 3 and 4 lens embodiments described above can be produced using wafer level optic (WLO) techniques such as disclosed in "All-glass wafer-level lens technology for array cameras". Palle Geltzer Dinesen, AAC Technologies, Digital Photography X, edited by Nitin Sampat, Radka Tezaur, et. al. Proc. of SPIE-IS&T Electronic Imaging, SPIE Vol. 9023, 902303.

Other useful techniques for providing optical assemblies for use in image acquisition systems of the type described above are disclosed in "Wafer-level packaging of micro-optics Miniaturized imaging systems", R. Volkel, M. Eisner, K. J. Weible, Microelectronic Engineering 67-68 (2003) 461-472; "Rapid fabrication of semi-ellipsoid microlens using thermal reflow with two different photoresists", Zhen-Jie Lian, Shih-Yu Hung, Ming-Ho Shen, Hsiharng Yang Microelectronic Engineering 115 (2014) 46-50; "Wafer-level manufacturing technology of glass microlenses", U. Gossner, T. Hoeftmann, R. Wieland, W. Hansch Appl. Phys. A (2014) 116:415-425; U.S. Pat. No. 6,096,155 which discloses a method of dicing wafer level integrated multiple optical elements; U.S. Pat. No. 6,649,008 which discloses a method of mass producing and packaging integrated subsystems; US2014/375866, AAC, which discloses an integrated lens stack; and US 2014/0192252, AAC which discloses an array camera.

WLO processes similar to those provided by AAC referred to above are also available from Digital Optics Corporation of San Jose, Calif.; or Heptagon Micro Optics Pte Ltd, Singapore.

In one variant of WLO, referred to as "polymer on glass", a master tool is used to create temporary inverses (stamps). The master tool is usually formed of metal and made using diamond turning with lens design being very tightly coupled to what kind of lens shapes and sizes can be cut in the master tool.

Once a temporary stamp is provided, polymer drops or puddles are dispensed onto a glass carrier and the temporary stamp is then temporarily bonded to the glass carrier to form the lenses. After bonding and cure, the stamp is removed to provide a glass carrier populated with potentially thousands of lenslets. The same process can be applied on the other side of the glass carrier to create another lens surface. In this case, an alignment step is required to make sure the top lenslets are aligned with the bottom ones.

If required, an aperture can be added to the various lenslets of the array through a masking, metal coating and stripping process.

In another variant of WLO, molten glass is injected between a pair of master tools to fill in the cavities between the took, before then curing and releasing the mold. Using such a process, care must be taken in determining the right volume, pressure and temperature to ensure that all the cavities are filled completely. Again, the lens design is very tightly coupled to both the master tool and to the manufacturing process.

Again, while glass is used in the above described embodiments, it is also possible to produce one or both of the front or rear optical elements from a plastics material.

The embodiments above are described as being optimized for the wavelength range $\lambda$=800-900 nm, however, it will be appreciated that optics suitable for operating in the range from $\lambda$=740 nm to beyond 1000 nm could also be employed.

In any case, WLO techniques are normally used to provide homogenous arrays of optics, however, by forming master tools with an array of repeating cells, each cell comprising a plurality of different forms corresponding to respective lens shapes of a cluster, the tools can be used to produce the required set of optics for use in the above described embodiments.

While the above described embodiments have been described in terms of their suitability for incorporation within a srnartphone, it will be seen that the image acquisition system can be incorporated within any number of devices including tablet computers, laptop computers or even dedicated biometric recognition devices.

The invention claimed is:

1. An image acquisition system for acquiring iris images for use in biometric recognition of a subject, the system including an optical system comprising:
    at least first and second lens systems each arranged in front of a common image sensor with each lens system including an optical axis in parallel spaced apart relationship to the optical axis of the other lens system, each lens system having a fixed focus, and a different aperture than the other lens system to provide a different angular field of view, each of the first and second lens systems comprising multiple optical elements, the first lens system having a closer focus and a smaller aperture than the second lens system, such that the image acquisition system can simultaneously acquire iris images across a focal range of at least from 200 mm to 300 mm.

2. An image acquisition system according to claim 1 comprising two, three or four fixed focus lens system.

3. An image acquisition system according to claim 1 wherein each lens system has a fixed focal length extending between approximately 4.0 mm and 5.0 mm.

4. An image acquisition system according to claim 1 wherein each lens system comprises an optical assembly have a total track length less than approximately 4.22 mm.

5. An image acquisition system according to claim 1 wherein each lens system comprises at least two lenses that simultaneously provide images over a focus range extending from 180 mm to 350 mm.

6. An image acquisition system according to claim 1 comprising at least three lens systems that simultaneously provide images over a focus range extending from 150 mm to 480 mm.

7. An image acquisition system according to claim 1 comprising at least three lens systems that simultaneously provide images over a focus range extending from 133 mm to 530 mm.

8. An image acquisition system according to claim 1 wherein each lens system comprises multiple lenses providing a focal length f approximately equal to 4.26 mm.

9. An image acquisition system according to claim 1 comprising two lens systems with aperture diameters of approximately 1.3 mm and 1.7 mm respectively.

10. An image acquisition system according to claim 1 where each lens system comprises: a front optical element and a rear optical element disposed between said front optical element and said sensor.

11. The image acquisition system of claim 10 wherein said rear optical element is spaced 0.8 mm from said sensor and wherein said front optical element is spaced 2.2 mm from the rear optical element.

12. The image acquisition system according to claim 10 wherein the optical characteristics of the optical elements of the first lens system differ from the optical characteristics of the optical elements of the second lens system only in the thickness of the respective rear optical elements.

13. An image acquisition system according to claim 10 wherein each of said front and rear optical elements is spaced apart by air.

14. An image acquisition system according to claim 10 wherein said front optical elements of the lens system are formed on a common substrate.

15. An image acquisition system according to claim 14 wherein said front optical elements comprises a molded glass.

16. An image acquisition system according to claim 10 wherein said rear optical elements for each lens system is formed on a common substrate.

17. An image acquisition system according to claim 16 wherein said rear optical elements comprise a molded glass different than material forming the front optical elements.

18. An image acquisition system according to claim 10 wherein surfaces of said front and rear optical elements facing said sensor have aspheric characteristics.

19. An image acquisition system according to claim 1 further comprising an infra-red flash.

20. An image acquisition system according to claim 1 wherein said sensor comprises an RGB sensor.

21. An image acquisition system according to claim 1 wherein said sensor comprises an RGB-IR sensor.

22. An image acquisition system according to claim 1 wherein the systems are arranged in either a regular or an irregular arrangement.

23. A smartphone including the image acquisition system according to claim 1.

* * * * *